United States Patent
Gagnon et al.

(10) Patent No.: US 10,400,934 B2
(45) Date of Patent: Sep. 3, 2019

(54) INSERTION TOOL FOR REHABILITATION TUBULAR LINER IN PIPES AND PIPELINES

(71) Applicant: Sanexen Environmental Services Inc., Brossard (CA)

(72) Inventors: Gilles Gagnon, Repentigny (CA); Serge Veilleux, Saint-Hubert (CA); Vincent Sevigny Veilleux, Saint-Hubert (CA)

(73) Assignee: SANEXEN ENVIRONMENTAL SERVICES INC., Brossard (CA)

( * ) Notice: Subject to any disclaimer, the term of this patent is extended or adjusted under 35 U.S.C. 154(b) by 0 days.

(21) Appl. No.: 15/686,226

(22) Filed: Aug. 25, 2017

(65) Prior Publication Data

US 2019/0063661 A1 Feb. 28, 2019

(51) Int. Cl.
*F16L 55/18* (2006.01)
*F16L 55/165* (2006.01)

(52) U.S. Cl.
CPC ........... *F16L 55/18* (2013.01); *F16L 55/1652* (2013.01)

(58) Field of Classification Search
CPC .... F16L 55/1651; F16L 55/179; F16L 55/265
USPC .................. 138/98, 97; 405/184.2
See application file for complete search history.

(56) References Cited

U.S. PATENT DOCUMENTS

| | | | | | |
|---|---|---|---|---|---|
| 2,794,758 | A | * | 6/1957 | Harper | B29C 63/36 138/98 |
| 5,816,293 | A | * | 10/1998 | Kiest, Jr. | B29C 63/0095 138/98 |
| 6,631,739 | B2 | * | 10/2003 | Kamiyama | F16L 55/1651 138/97 |
| 7,051,766 | B2 | * | 5/2006 | Kamiyama | F16L 55/1651 138/97 |
| 2002/0020453 | A1 | * | 2/2002 | Kamiyama | F16L 55/1651 138/98 |
| 2009/0041546 | A1 | * | 2/2009 | Kiest, Jr. | F16L 55/1651 405/184.2 |

* cited by examiner

*Primary Examiner* — Patrick F Brinson
(74) *Attorney, Agent, or Firm* — Gwendoline Bruneau

(57) ABSTRACT

A method and apparatus for inserting a tubular liner impregnated with a hardening resin into the conduits or pipes to be rehabilitated is disclosed. The apparatus is a tool comprising a cylindrical segment and a conical segment, the cylindrical segment and the conical segment connected together to form a passageway adapted to guide a tubular liner inside a host pipe.

3 Claims, 2 Drawing Sheets

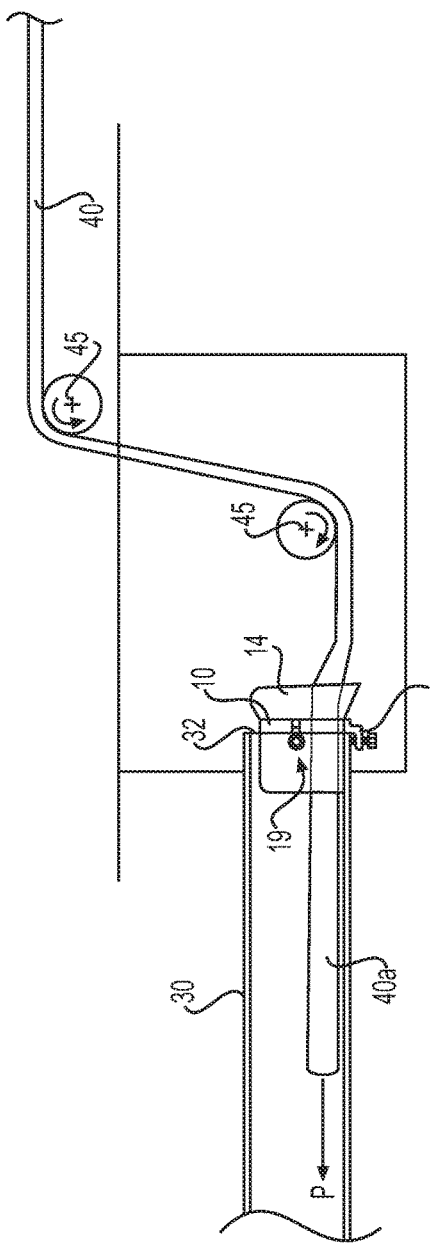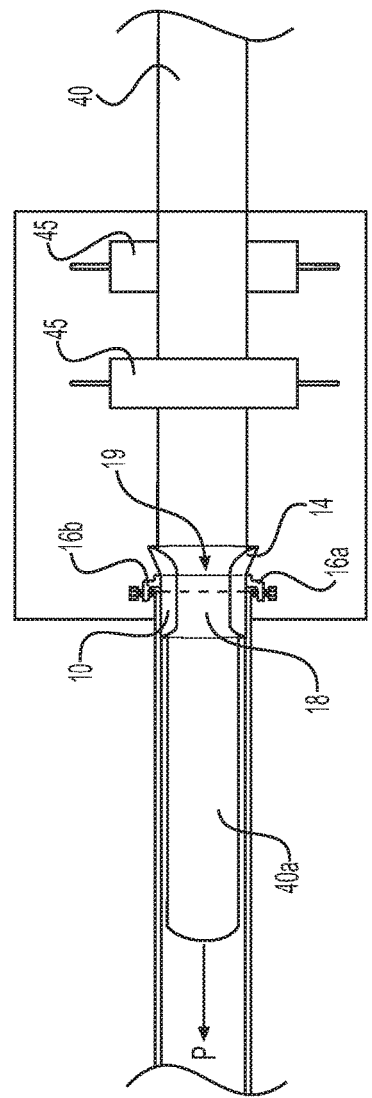

INSERTION TOOL FOR REHABILITATION TUBULAR LINER IN PIPES AND PIPELINES

FIELD OF THE INVENTION

The present invention relates to a method and apparatus for rehabilitating underground conduits or pipes and more specifically to a method and apparatus for inserting a tubular liner impregnated with a hardening resin into the conduits or pipes to be rehabilitated.

BACKGROUND OF THE INVENTION

Underground and surface pipes, either potable water pipes, waste water pipes or sewer pipes, are typically made of rigid materials such as reinforced concrete, cast iron, ductile iron, steel and hard polymers such as PVC, HDPE, etc., that are durable and adapted to resist internal fluid pressure and the external pressure of the weight of the soil above them. Underground and surface pipes networks provide essential services to homes and businesses and have been deployed in cities, towns and villages for more than a century. Buried and surface pipes connected together in a network extends over long distances, spreads out in all directions to provide services to residential homes or businesses over a wide area. Underground and surface pipes are subject to normal wear and degradation over extended periods of time due to cyclical loads, earth movements, corrosion, increased porosity, cracks and overall deterioration. As a result of their long service life, underground and surface pipes will become damaged and require repair or replacement.

Replacement of damaged sections or portions of a pipe network is an expensive, disruptive and time-consuming operation requiring heavy equipment for accessing, removal and replacement. Replacing older networks of underground water conduits with new ones is unrealistic because of the sheer magnitude of the work that would be involved and is avoided as much as possible. However, repairing and rehabilitating existing water networks without the need to excavate represents a feasible alternative. Methods exist for repairing the walls of pipes and other conduits. One such method involves the use of a tubular liner impregnated with a cured-in-place resinous material, referred to as cured-in-place pipe (CIPP) which re-lines the inner walls of the conduit or pipe to repair the network of conduits or pipe. The liner is impregnated with a resin capable of curing and hardening to form a new inner wall for the aging or damaged pipes. A length of CIPP liner is inserted in the conduit or pipe and is pulled inside the conduit or pipe through a specific segment of the conduit or pipe from one entrance point to an exit point. Once in place, pressurized water is introduced inside the CIPP liner to press the CIPP liner against the pipe wall. The resin is then allowed to cure and harden, thereby creating a new sealed interior pipe wall.

The tubular liner is typically a flat textile material or felt material which is rolled into tubular form and stitched along its seam or a seamless tubular textile jacket made of warps and wefts woven into tubular form. When the tubular liner inserted into the entrance point of the conduit or pipe and pulled inside the segment of the conduit or pipe to be rehabilitated, the tubular liner often drags on the edge of the conduit's entrance opening thereby increasing the force required to pull the length of tubular liner through the segment of the conduit or pipe. In the process, the tubular liner end up being stretched unevenly over its length, it may form folds and wrinkles and it may get damaged.

Tubular liners made of rolled material stitched along the seam are particularly vulnerable as the seam is the weak portion of the tubular liner and the stitches may break under load thereby ripping the tubular liner at the seam and creating gaps which render the rehabilitation of the underground or surface pipe ineffective. Seamless tubular textile jackets are stronger because they do not have a seam that can be torn apart. However, seamless tubular liners may be unevenly stretched or wrinkles, bulges and/or folds may be formed when the seamless tubular liner is pulled and dragged on the edge of the conduit's entrance opening and the quality of the rehabilitation liner once cured may be affected.

Thus, there is a need for a method and an apparatus for inserting a tubular liner into a host conduit or pipe to be rehabilitated that prevents stretching, wrinkling, bulging, folding or damaging the tubular when it is pulled inside the host conduit or pipe.

SUMMARY OF THE INVENTION

It is an object of the present invention to ameliorate at least some of the inconveniences present in the prior art.

In one aspect, the invention provides an insertion and guiding tool comprising a cylindrical segment having an edge and a conical segment having an edge, the cylindrical segment and the conical segment connected together at their edges to form a passageway adapted to guide a CIPP tubular liner inside a host pipe.

In an additional aspect, the insertion and guiding tool comprises at least one anchoring device adapted to secure the tool onto an opening of a host pipe.

In an additional aspect, the invention provides a method of inserting a CIPP tubular liner into a host pipe comprising the step of reducing the width of the CIPP tubular liner using a conical insertion tool positioned at the opening of the host pipe.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 4 is a schematic side elevational view of a work site in which a tubular liner is inserted and guided into a host pipe using the insertion and guiding tool illustrated in FIG. 1; and FIG. 5 is a schematic top plan view of the work site illustrated in FIG. 4.

DETAILED DESCRIPTION OF THE PREFERRED EMBODIMENTS

Figure 1:
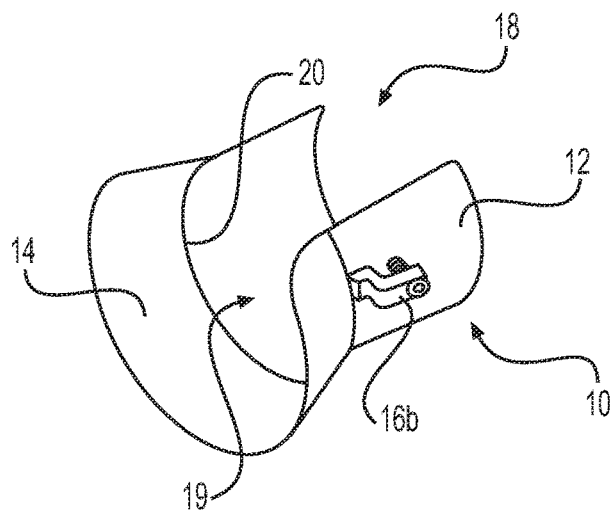
FIG. 1 is a perspective view of an insertion and guiding tool in accordance with one embodiment of the invention.
Figure 2:
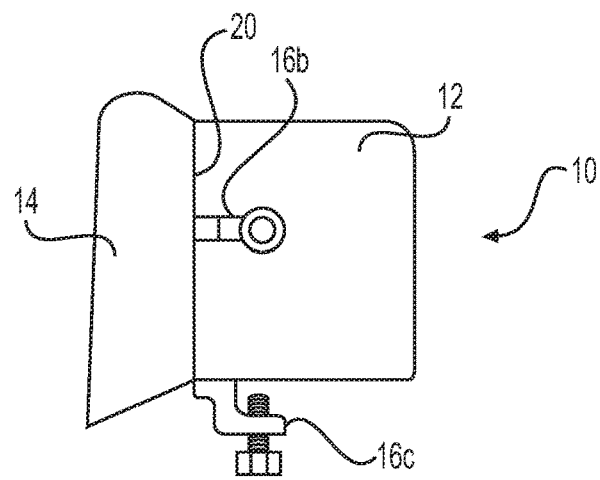
FIG. 2 is a side elevational view of the insertion and guiding tool illustrated in FIG. 1.
Figure 3:
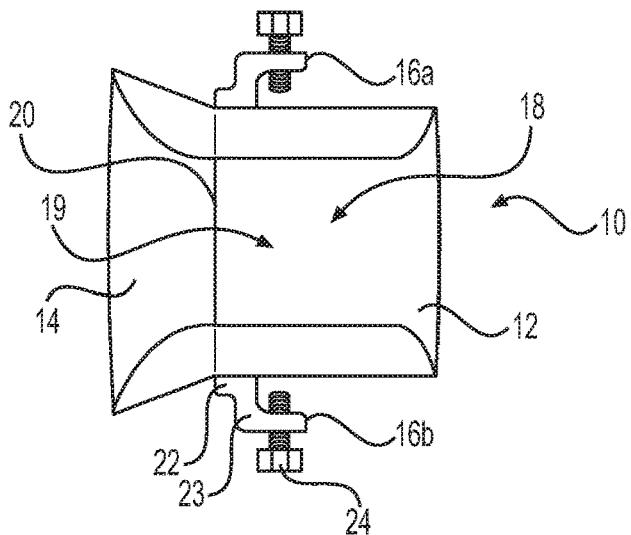
FIG. 3 is a top plan view of the insertion and guiding tool illustrated in FIG. 1.

With reference to FIGS. 1, 2 and 3, there is shown an insertion and guiding tool 10 in accordance with a preferred embodiment of the invention. The insertion and guiding tool 10 includes two main portions: A cylindrical insertion segment 12 adapted to fit inside the opening of a host pipe and a conical guiding segment 14 or lip adapted to guide a tubular liner inside the host pipe by gradually and smoothly reducing the width of the tubular liner to fit inside the host pipe and protecting the tubular liner from the edges of the opening of the host pipe. The cylindrical insertion segment 12 is preferably made of a sheet metal approximately 0.1 inch thick which is bent in the form of an approximately ⅔ cylinder leaving an opening 18. Similarly, the conical guiding segment 14 is preferably made of a sheet metal approximately 0.1 inch thick which is bent in the form of an approximately ⅔ conical lip defining an opening aligned with the opening 18. The edges of the two segments 12 and 14 have similar profiles and are typically welded or riveted together at their junction 20 to form a passageway 19 for a tubular liner. The preferred embodiment of the insertion and guiding tool 10 is made of sheet metal however, other materials such as molded plastics or composite may be used.

The outer diameter of the cylindrical insertion segment 12 is specifically adapted to fit inside a host pipe having a specific diameter. For example, for a host pipe having an 8 inch inside diameter, the outer diameter of the cylindrical insertion segment 12 would be approximately 7.8 inch to ensure easy installation.

Fasteners or anchoring devices 16a, 16b and 16c are positioned along the outer circumference of the insertion and guiding tool 10, at the junction 20 of the cylindrical insertion segment 12 and the conical guiding segment 14: A first and second anchoring device 16a and 16b positioned on each side of the insertion and guiding tool 10, and a third anchoring device 16c positioned at the bottom of the insertion and guiding tool 10. As illustrated in FIG. 3, each anchoring device 16a, 16b and 16c consists of an anchor 22 made of steel having a leg 23 spaced apart from the cylindrical insertion segment 12 and a bolt 24 inserted through a threaded hole (not shown) in the leg 23.

With reference to FIGS. 4 and 5, in operation, the insertion and guiding tool 10 is inserted into the opening 32 of an underground host pipe 30 to be rehabilitated with a CIPP tubular liner 40 whereby the conical guiding segment 14 protrudes from the edge of the opening 32 and covers the edge of the entrance or opening 32 of the underground host pipe 30. The legs 23 of the anchoring devices 16a, 16b and 16c extend outside the host pipe 30 and the insertion and guiding tool 10 is secured to the host pipe 30 by tightening the bolts 24 of the anchoring devices 16a, 16b and 16c.

The CIPP tubular liner 40, which is still in a flat state, is routed from aboveground through a series of rollers 45 down to the entrance or opening 32 of the host pipe 30. The flat CIPP tubular liner 40, which is wider than the opening 32, is then bent manually to reduce its width and inserted into the passageway 19 of the insertion and guiding tool 10 and guided inside the host pipe 30 where it assumes a partially circular shape 40a. The opening 18 is preferably positioned upward to provide easier access to technicians for inserting cables and other equipment for example. The CIPP tubular liner 40a is pulled via a cable or other means as indicated by arrow P.

The conical guiding segment 14 of the insertion and guiding tool 10 guides the CIPP tubular liner 40 into the host pipe 30 by gradually and smoothly reducing the width of the CIPP tubular liner 40 to fit inside the host pipe 30 and simultaneously prevents the CIPP tubular liner from dragging on the edge of the entrance or opening 32 of the host pipe 30 thereby protecting the CIPP tubular liner 40 from potential damage from the edges of the opening 32. Furthermore, the guidance and gradual reduction of the width of the CIPP tubular liner 40 by the insertion and guiding tool 10 prevents uneven stretching of the CIPP tubular liner 40 caused by uneven friction with the edge of the opening 32 and also prevents the formation of wrinkles, bulges and/or folds on the CIPP tubular liner 40 when the latter is pulled inside the host pipe 30 thereby ensuring a high quality CIPP rehabilitation liner once cured.

The insertion and guiding tool 10 also has the beneficial effect of reducing the force P required to pull the length of CIPP tubular liner 40 through the host pipe 30 as it reduces friction at the opening 32 of the host pipe 30.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. An insertion and guiding tool comprising a cylindrical segment having an edge and a conical segment having an edge, the cylindrical segment and the conical segment connected together at their edges to form a passageway adapted to guide a CIPP tubular liner inside a host pipe, wherein the cylindrical segment is made of a sheet metal bent in the form of a ⅔ cylinder and the conical segment is made of a sheet metal bent in the form of a ⅔ conical lip.

2. The insertion and guiding tool of claim 1, wherein the cylindrical segment includes an opening and the conical segment includes an opening aligned with the opening of the cylindrical segment.

3. The insertion and guiding tool of claim 1, further comprising at least one anchoring device adapted to secure the tool onto an opening of a host pipe.

* * * * *